May 9, 1967 — T. G. WERDER — 3,318,351
SLICING MACHINE
Filed July 24, 1964 — 5 Sheets-Sheet 1

Inventor
Theodore G. Werder
By
Wolfe, Hubbard, Voit & Osann
Attys.

May 9, 1967    T. G. WERDER    3,318,351
SLICING MACHINE

Filed July 24, 1964    5 Sheets-Sheet 3

Inventor
Theodore G. Werder
By
Wolfe, Hubbard, Voit & Osann
Attys.

May 9, 1967 — T. G. WERDER — 3,318,351
SLICING MACHINE
Filed July 24, 1964 — 5 Sheets-Sheet 4

Inventor
Theodore G. Werder
By Wolfe, Hubbard,
Voit & Osann
Attys.

May 9, 1967    T. G. WERDER    3,318,351
SLICING MACHINE

Filed July 24, 1964    5 Sheets-Sheet 5

Inventor
Theodore G. Werder
By
Wolfe, Hubbard, Voit & Osann
Attys.

United States Patent Office 3,318,351
Patented May 9, 1967

---

3,318,351
SLICING MACHINE
Theodore G. Werder, Des Plaines, Ill., assignor to Great Lakes Stamp & Mfg. Co., Inc., Chicago, Ill., a corporation of Illinois
Filed July 24, 1964, Ser. No. 384,911
10 Claims. (Cl. 146—94)

This invention relates generally to food handling machinery and, more particularly, to machines for slicing and stacking food products such as sausages and the like.

Various kinds of sausage and many specialty food products are conventionally formed in long loaves. It has become common to market these products in packaged stacks of slices formed by slicing the loaves transversely, stacking the slices to make a desired package weight, and wrapping the resulting stacks.

It is a primary object of the present invention to provide a slicing machine for slicing product loaves obliquely to the loaf axis so as to produce oblong slices, while continuously feeding the product loaves in seriatim to the slicing blade. A related object is to provide an adaptor for a conventional slicing machine to permit the described type of operation.

Another object of the present invention is to provide a slicing machine having a continuous feeding mechanism which also serves as one of the cutting elements. In this connection, it is an object of the invention to provide such a slicing machine in which the feeding mechanism in effect floats on the slicing blade so as to maintain accurate alinement between the blade and the feeding mechanism during the slicing operation.

In is a further object of the invention to provide a slicing machine of the type described in which the feeding mechanism continuously feeds the product loaves at the desired angle with respect to the slicing blade while holding the loaves firmly against a back-up member to achieve clean smooth slices despite variations in the diameter or transverse thickness of the loaves.

It is still another object of the invention to provide such a slicing machine in which the feeding mechanism is adjustable for achieving accurate initial alinement of the cutting element in the feeding mechanism with the slicer blade.

Still another object of the invention is to provide a slicing machine feeder mechanism of the type described which is extremely simple and economical to manufacture and maintain, and which functions with complete reliability.

Yet another object of the invention is to provide a slicing machine of the above character which permits accurate adjustment of both the slice thickness and the number of slices in each stack, while the machine is in operation. A related object is to provide such a slicing machine which maintains positive control of the product at all times during the slicing and stacking operation, in all slice thickness and stack height settings and which, therefore, is able to function at high speed with complete reliability.

Other objects and advantages of the invention will become apparent upon reading the following detailed description and upon reference to the drawings, in which:

FIG. 10 is an enlarged fragmentary section taken along line 10—10 in FIG. 3 and showing the cooperation between the slicer blade and the lower end of the feed tube.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Figure 1:
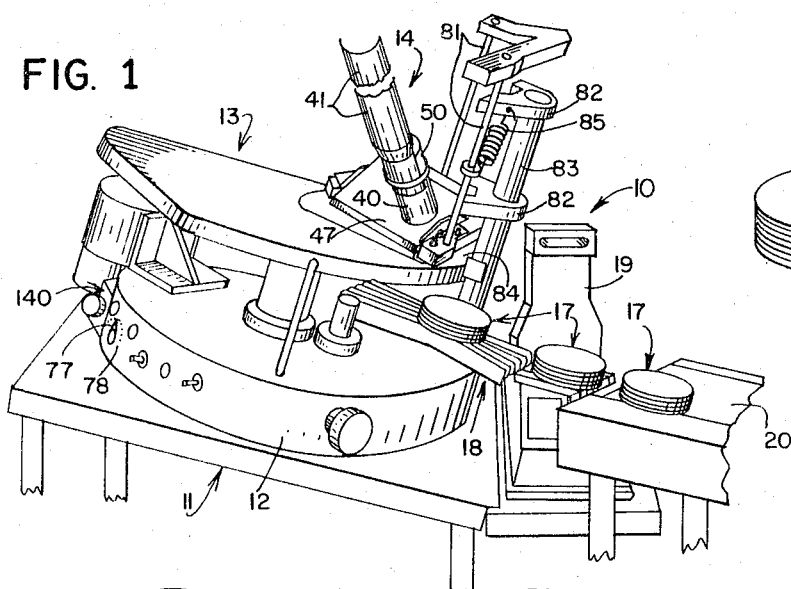
FIGURE 1 is a fragmentary perspective of a slicing machine constructed in accordance with the present invention.
Figure 2:
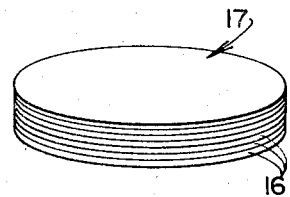
FIG. 2 is a perspective of a stack of oblong food product slices prepared by the machine of FIG. 1.

Turning first to FIG. 1, there is shown a slicing machine 10 embodying the invention and including an inclined frame 11 having a control housing 12 above which is supported a cutting assembly 13 and product loaf feeding arrangement 14. A food product loaf 15 is supported in the feeding arrangement 14 and sliced by the cutting assembly 13 into individual slices 16 which are arranged in stacks 17. The stacks 17 are fed by discharge conveyor 18 to a check weighing scale 19 from which they move to a packaging conveyor 20. Commercial machines of the type herein described effectively slice loaves of all standard cross sections and easily form uniform slices of any desired thickness from about one-half inch down to less than one-sixteenth inch.

The cutting assembly 13 includes a circular table 25 having an overlying slicer blade 26 both of which, in the illustrated construction, are mounted for rotation beneath the feeding mechanism 14. The table 25 is formed with a depending sleeve 27 which is supported in bearings 28 mounted in a post 29 that is rigidly secured to the housing 12 of the frame 11 (see FIG. 4). The blade 26 is secured to a shaft 31 which is slidably received within the sleeve 27. A pin 32 locks the table 25 and the blade 26 against relative rotation so that the table and the blade rotate in unison beneath the product loaf in the feeding arrangement 14.

Figure 3:
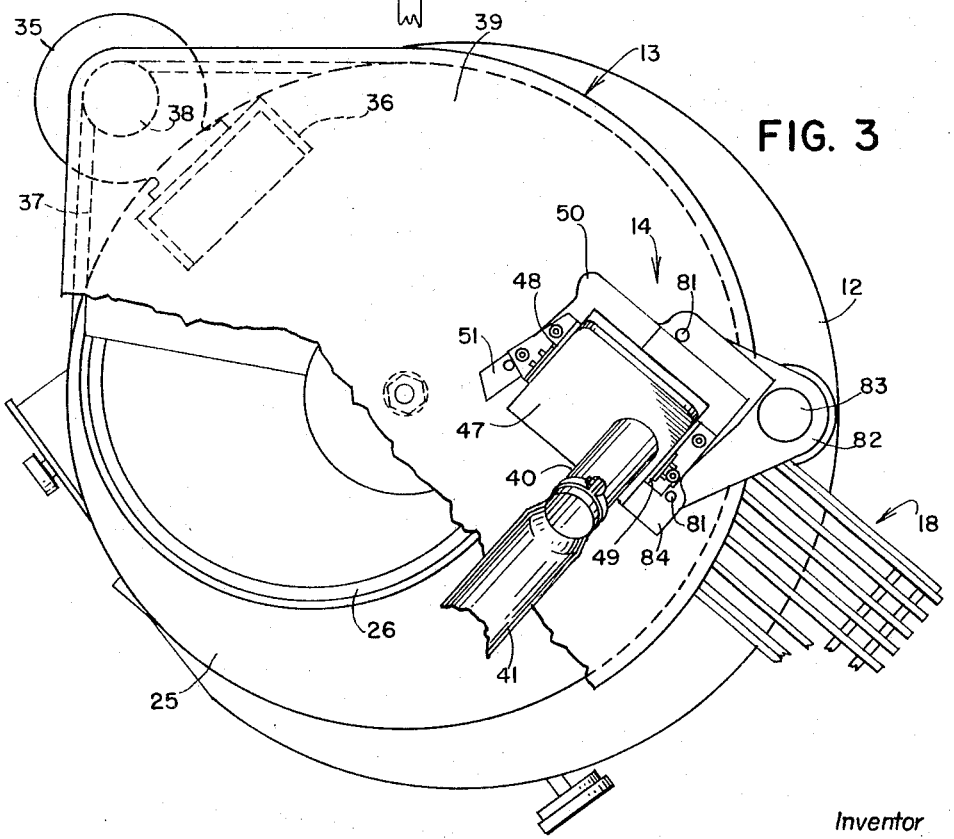
FIG. 3 is an enlarged top plan of the machine shown in FIG. 1 with portions broken away.

To rotate the blade 26, a main drive motor 35 is secured to the bracket 36 on the control housing 12 and is coupled by a belt 37, trained about a motor pulley 38 and the periphery of the table 25, to the table and the slicer blade 26. When energized, the drive motor rotates the table 25 and the slicer blade 26 in a counter-clockwise direction as seen in FIG. 3. Preferably, a shield or cover 39 is provided to overlay and surround the cutting table 25, the slicer blade 26, the motor pulley 38, and the belt 37.

Figure 6:
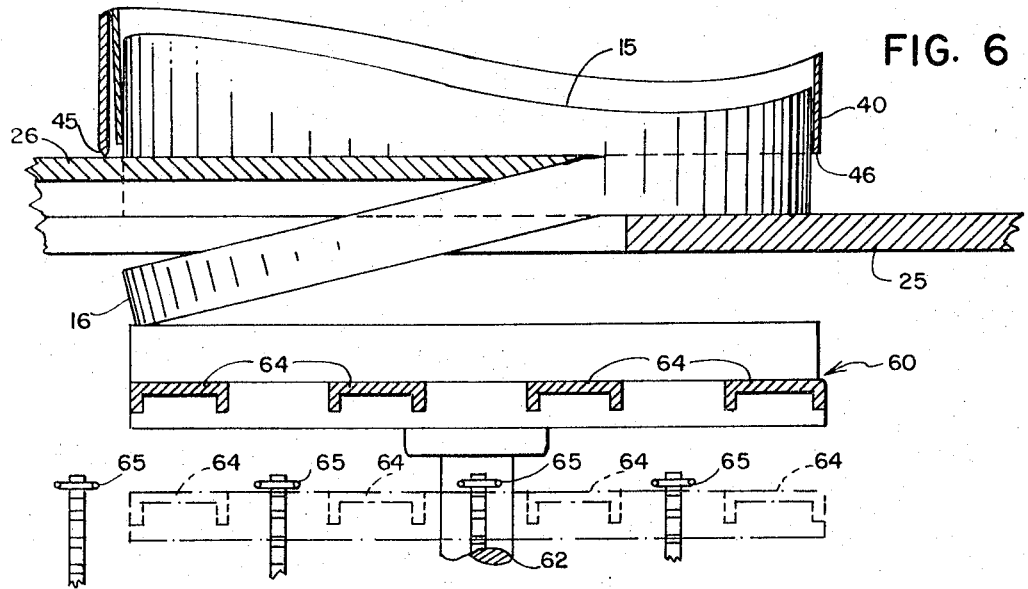
FIG. 6 is an enlarged fragmentary section taken approximately along the lines 6—6 in FIG. 3.

With the machine in operation, the loaf 15 is supported in the feeding arrangement 14 with its lower surface just above the table 25 (see FIG. 6). Upon each revolution of the table 25 and the slicer blade 26, a slice 16 is cut from the bottom of the loaf having a thickness depending upon the spacing of the slicer blade 26 above the lower end of the loaf 15. The spiral blade 26 produces a smooth, slicing cut without a chopping or tearing effect and thus clean, even slices are formed with all types of common food products.

In accordance with one aspect of the present invention, there is provided a feeding arrangement comprising, in combination, a tubular feed member adapted to receive the product loaves to be sliced above the slicer blade and to feed them downwardly toward the blade, the lower end of the tubular feed member being beveled at least on the cut-off side of the tube so as to cooperate with the slicer blade to produce a scissors-like cutting action on a product loaf extending down from the tubular feed member when said member is disposed with its axis obliquely to the slicer blade. Thus, as shown most clearly in FIGS. 4 and 5, the feeding assembly 14 includes a tubular feed member 40 adapted to receive the product loaf to be sliced above the blade 26, and extending downwardly at an acute angle of about 37° with respect to the plane of the slicer blade 26. It has been found that this angle produces oblong slices of a desirable shape, and also is effective for providing a gravity feed of the elongated loaves down through the tubular feed member. In this connection the tubular feed member 40 should have a smooth inner surface to prevent the product loaves from becoming caught or "hanging up" inside the tube. It will be appreciated that the inclined tubular feed member 40 permits the continuous feeding of a plurality of product loaves in seriatim and, in fact, it is preferred that there always be at least one additional product loaf bearing down against the upper end of the particular loaf being sliced in order to assist in the gravity feeding.

In order to support the upper portion of the product loaf in substantially straight line relationship with the lower portion being sliced, and also to support succeeding product loaves, an arcuate chute 41 is rigidly connected to the upper end of the main feed tube 40. In the particular embodiment illustrated, the chute 41 is connected to the tube 40 by means of a flexible band 42 which is tightened by a conventional bolt and nut arrangement as illustrated. The chute 41 is of slightly large diameter at the top than at the bottom to facilitate the manual placement of the product loaves therein.

In carrying out the present invention, the lower end 44 of the tubular feed member is beveled (see FIG. 5) so as to be substantially parallel with the slicer blade 26 when the tube 40 is disposed obliquely at some predetermined angle with respect to the slicer blade, such as the 37° angle in the illustrated device. Moreover, the vertical position of the tubular feed member is adjusted so that the lower end 44 is substantially co-planar with the slicer blade whereby the blade 26 cooperates with the lower end 44 of the tube to produce a scissors-like cutting action on a product loaf extending down from the tube. Thus, the tubular member 40 serves not only as an angular feeding conduit, but also functions as one of the cutting elements, thereby insuring a smooth, even cut without the use of supplemental machine and cutting elements. In order to prevent unnecessary wear on the edge of the cutting blade and to facilitate its wiping movement across the lower end of the tubular member 40, the inboard side of the lower end 44 of the tube, i.e. the side which the blade overlaps first during each revolution, is slightly relieved and rounded, as at 45, so that the blade can pass freely thereunder. The cut-off side of the lower end 44 of the tube, on the other hand, is provided with a relatively sharp edge, as at 46, to produce a smooth, even cut.

Figure 4:
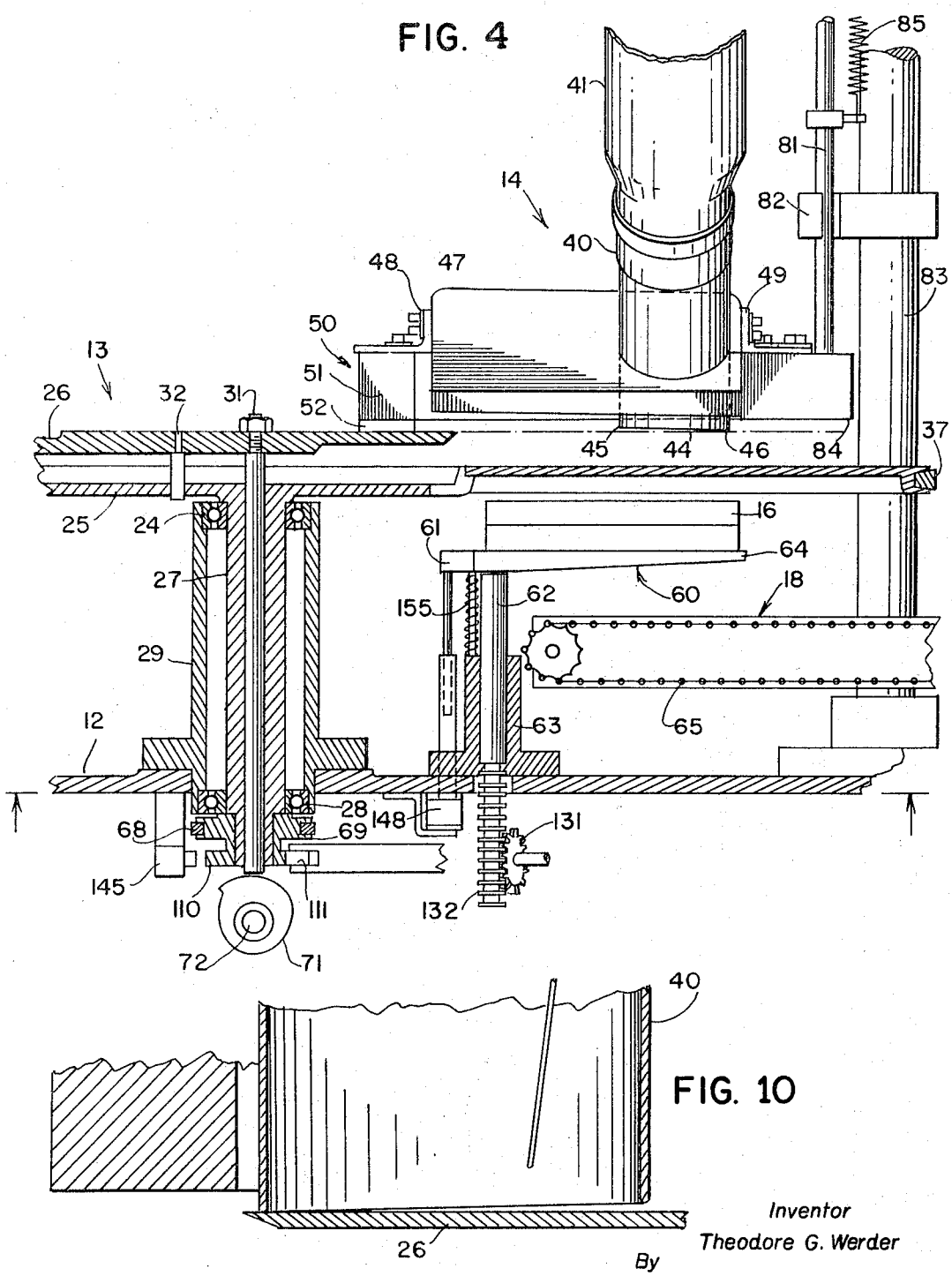
FIG. 4 is a further enlarged fragmentary section taken approximately along the lines 4—4 of FIG. 3.
Figure 5:
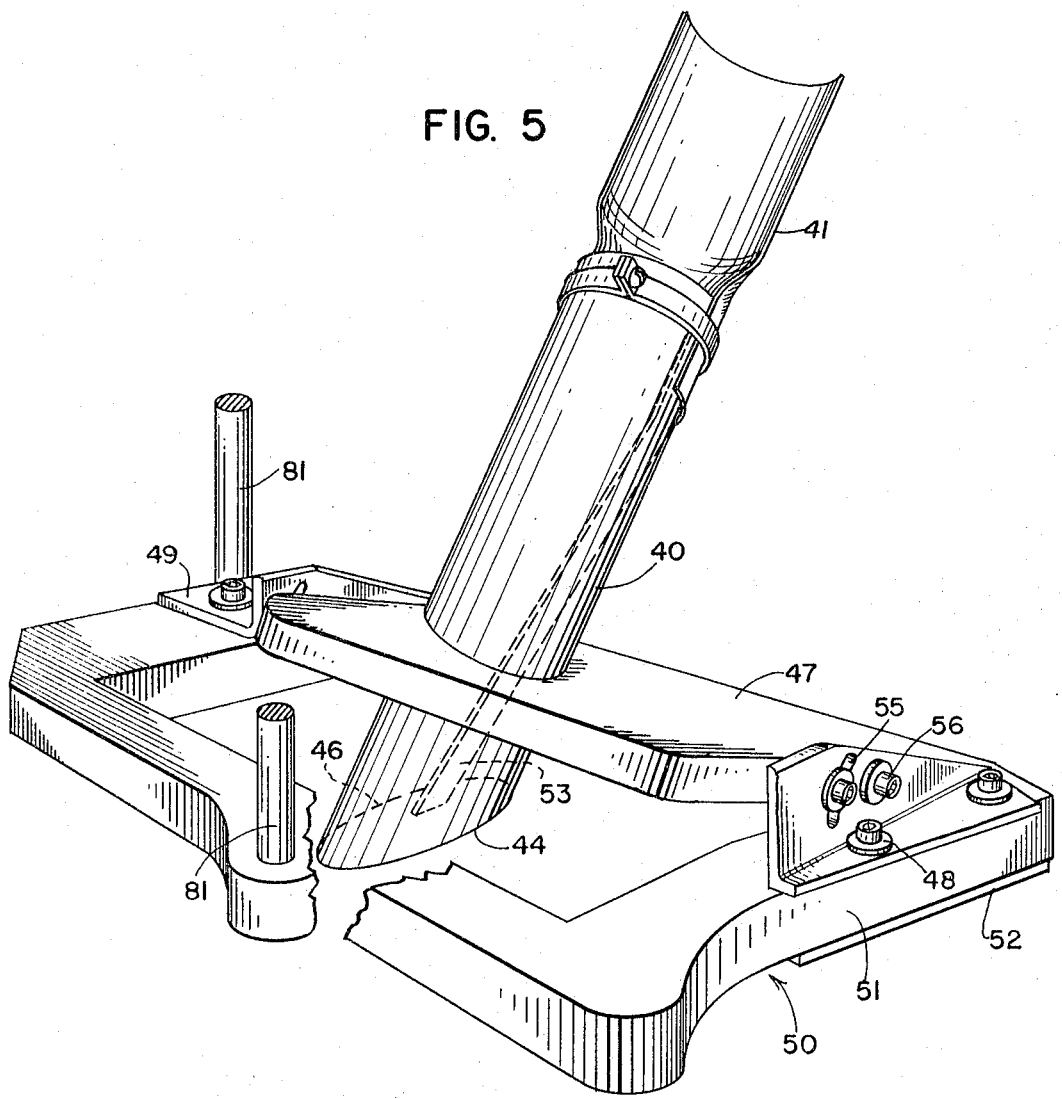
FIG. 5 is a perspective view of the feeding mechanism removed from the machine of FIG. 1.

In accordance with a further aspect of the invention, there is provided a mounting assembly which permits the tubular feed member to, in effect, float on the surface of the rotating slicer blade, whereby the lower end of the tubular feed member is maintained in accurate co-planar alinement with the rotating blade to produce the desired scissors-like cutting action with complete reliability. Thus, as can be seen in FIG. 4, the tubular feed member 40 is rigidly mounted within an aperture in a plate 47 by means of a set screw, with the lateral edges of the plate 47 being bolted to a pair of opposed mounting brackets 48 and 49. The brackets 48 and 49, in turn, are mounted on a subframe 50 which includes an arm 51 carrying a bearing pad 52 which supports the entire mounting assembly and the tubular feed member 40 on the upper surface of the central disc portion of the rotatable blade 26. For the purpose of maintaining the lower end 44 of the tube in accurate alinement with the rotating blade, the lower surface of the bearing pad 52, which is suitably made of nylon, is substantially co-planar with the cut-off side 46 of the lower end of the tubular member 40. It will be appreciated that the bearing pad 52 rests on the upper surface of the blade 26 even while it is rotating, so that the entire feeding assembly floats on the rotating blade.

As one feature of the invention, a biased guide means is provided within the tubular feed member for the purpose of continuously urging the product loaf toward the cut-off side of the tubular member, thereby insuring smooth, clean slices despite variations in the diameter or transverse thickness of the loaf. This guide means also permits the use of the same feeding mechanism with product loaves of varying sizes. Thus, referring to FIG. 5, an inwardly biased spring blade 53 is spot welded to the inboard side of the upper portion of the tubular feed member 40, with the depending lower portion of the blade 53 tapering inwardly toward the axis of the tube. Consequently, as the product loaf slides down through the tubular member 40, the guide blade 53 urges the loaf toward the cut-off side 46 at the lower end of the tube. Since the spring blade 53 is biased inwardly, i.e. toward the cut-off side of the tube, it easily compensates for variations in the diameter or transverse thickness of the product loaf, and the loaf is always firmly backed up against the outboard or cut-off side of the tubular member 40.

In order that the lower end of the tubular member 40 can be accurately alined with the slicer blade 26 when it is initially installed or for subsequently maintenance purposes, one opposed pair of the bolts which connect the plate 47 to the brackets 48 and 49 are received in a pair of inclined slots 55 formed in the brackets 48 and 49. To make minor adjustments in the angle of the tubular feed member 40, all four of the bolts 57 are loosened slightly so that the tubular member 40 and the plate 47 can be pivoted around the two lower bolts 56. All four bolts are then tightened again to fasten the tube and plate firmly in place.

The slices severed from the loaf drop downwardly through a discharge port 25a, formed in the table 25 beneath the slicer blade 26, onto a vertical movable stacking platform 60. The platform 60 includes a slidable frame 61 mounted on a rod 62 which is reciprocable in a collar 63 secured to the upper surface of the housing 12. A plurality of fingers 64 are formed with a frame 61 so as to be movable from a starting position just below the table 25 to a discharge position wherein the fingers 64 pass between and below a plurality of chains 65 making up the discharge conveyor 18 (see FIGS. 4 and 6). The discharge position of the platform 60 is shown in broken lines in FIGS. 4 and 6. It will be apparent that when the platform 60 is driven to its discharge position, with the fingers 64 between and beneath the conveyor chain 65, the slice or slices on the platform fingers will be engaged by the constantly driven chains 65 and carried from the platform to the check weighting scale 19.

The discharge conveyor chains 65 are constantly driven through bevel gearing 66 (see FIG. 7) which couple the chains to a drive post 67 journaled within the housing 12 that is constantly rotated by a belt 68 from a pulley 69 on the table sleeve 27 (see also FIG. 4).

Figure 7:
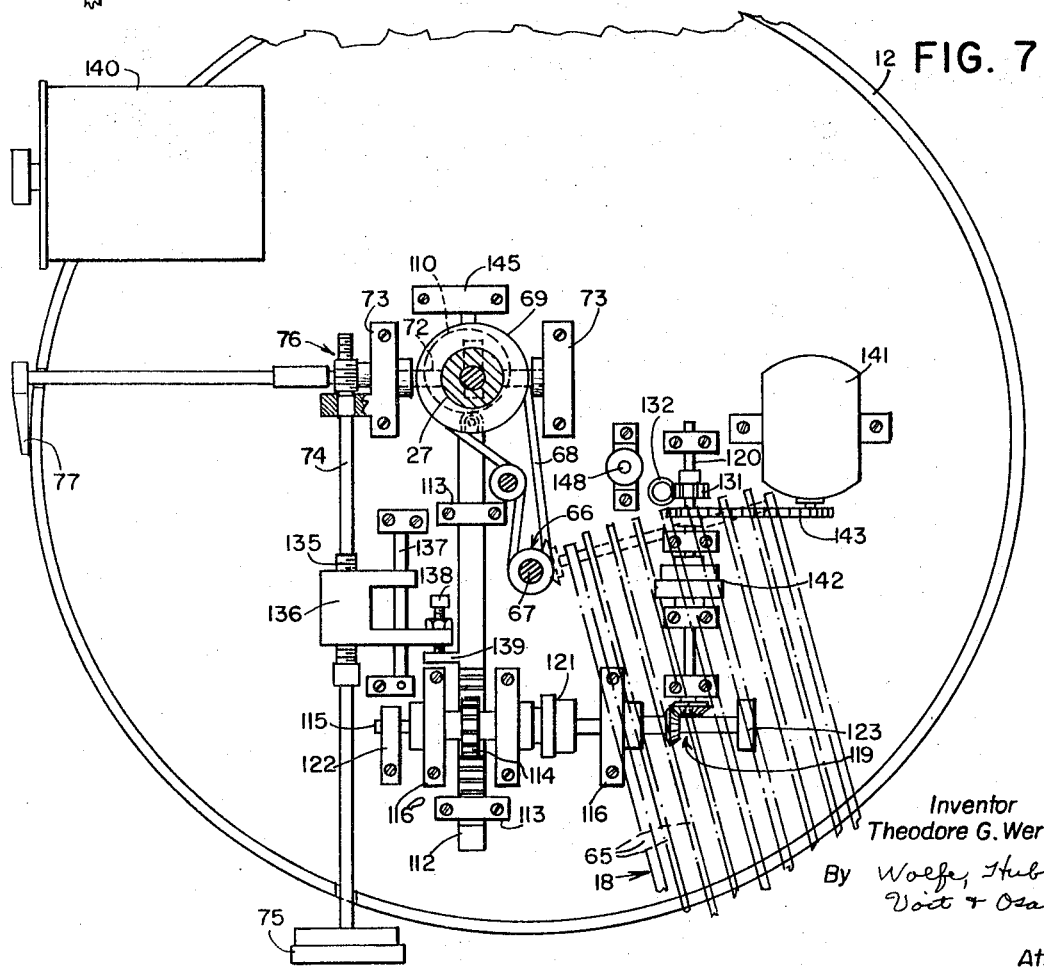
FIG. 7 is a section along the lines 7—7 in FIG. 4.

So as to vary the thickness of the slices cut by the machine 10, the slicer blade 26 is axially adjustable relative to the table 25 and for this purpose the blade shaft 31, that is slidably received within the table sleeve 27, rests on a lift cam 71 (FIGS. 4 and 8) mounted on a cam shaft 72 that is rotatably supported on the underside of the housing 12 by a pair of bearing blocks 73 (FIG. 7). To adjust and hold the cam shaft 72 in a desired angular position, a setting shaft 74 having an adjusting knob 75 is connected to worm gearing 76 to the cam shaft 72. It can thus be readily seen that manual operation of the knob 75 permits the cam shaft 72 to be rotated so that lift cam 71 vertically positions the blade 26 relative to the upper surface of the cutting table 25. Preferably a point 77 is mounted on the cam shaft 72 on the outside of the housing 12 so as to be clearly visible to the operator of the machine 10. The pointer 77 cooperates with a scale 78 (see FIG. 1) to indicate the setting of the blade 26 in terms of thickness of the slice which will be cut from the loaf upon rotation of the cutting table and the blade.

In order to permit vertical movement of the feeding assembly 14, and also to relieve part of the weight of the feeding assembly from the blade 26, the subframe 50 is provided with a pair of upwardly extending rods 81 which are slidably fitted in yokes 82 rigidly secured to a pedestal 83 which forms a part of the machine frame 11. The yokes 82 tend to pivot the subframe 50 about its outboard edge, indicated at 84, thereby relieving part of the weight of the feeder assembly from the blade 26. However, the yokes 82 are not secured to the rods 81, so that the feeder assembly is free to slide up and down with the thickness adjustments of the slicer blade 26 engaging the nylon bearing pad 52. Preferably, a tension helical spring 85 is extended between one of the rods 81 and the upper yoke 82 so as to further relieve the weight of the feeder assembly from the blade 26.

As the slicer blade 26 rotates past the feeder assembly 14, the platform 60 is lowered in incremental steps corresponding with the blade rotations, with the magnitude of the steps being maintained approximately equal to the spacing of the blade above the cutting table 25 in all positions of blade adjustment. At the same time, the product loaf is fed downwardly by gravity in steps equal to the slice thickness being severed from the loaves so that the loaf is always in proper position for cutting by the blade 26 with slices formed by the machine remaining uniform. Dropping of the platform 60 in steps equal to the thickness of the slice being formed maintains the platform 60, or the top of the stack of slices on the platform, at always the right level to receive subsequent slices in proper stacked alinement.

Figure 9:
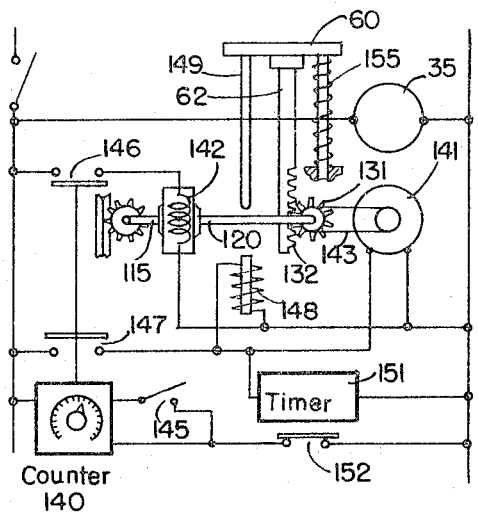
FIG. 9 is a schematic diagram of the control circuit for the mechanisms shown in FIG. 8.

For driving the platform 60 in incremental steps, a drive cam 110 is secured to the blade shaft 31 so as to cooperate with a cam follower 111 journaled on the end of a rack 112 (see FIGS. 4, 7, and 9). The rack 112 is supported by a pair of blocks 113 for sliding movement within the housing 12. Cooperating with teeth on the rack 112 is a pinion 114 secured to a drive shaft 115 that is journaled in a plurality of bearing blocks 116 within the housing 12. Bevel gearing 119 couples the drive shaft 115 to a platform drive shaft 120.

Figure 8:
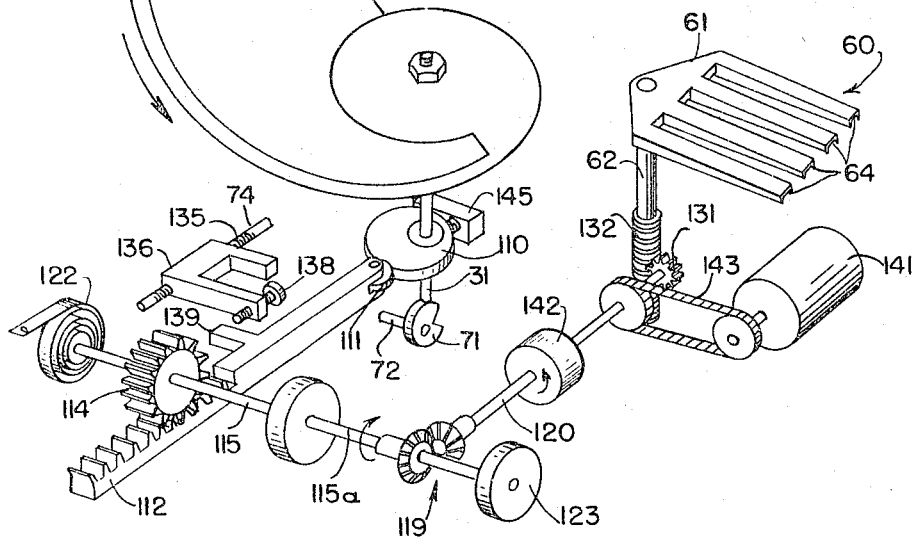
FIG. 8 is a partially diagrammatic perspective of the drive mechanisms embodied in the machine shown in FIG. 1.

The shaft 115 includes a portion 115a which is coupled thereto through a one-way clutch 121 arranged so that driving movement of the rack 112 in the direction of the arrows shown in FIG. 8 rotates the pinion 114, and thus the shaft 115, to "lock up" the clutch 121 and rotate the shaft portion 115a in unison with the shaft 115. When the high point of the cam 110 passes the cam follower 111, a torsion spring 122 rotates the shaft 115 in a reverse direction so as to return the rack 112 to its starting position in the direction opposite to the arrow appearing in FIG. 8. During this return movement, the clutch 121 rotates idly so that the shaft portion 115a is not driven in the return direction of the shaft 115. To positively prevent return rotation of the shaft portion 115a, a second one-way clutch 123 is provided to lock the shaft portion 115a to the housing 12 upon a tendency of the shaft portion to rotate in a direction opposite to the arrow appearing in FIG. 8. This clutch 123, of course, permits free rotation of the shaft portion 115a in the direction of the arrow.

It will thus be apparent that continuous rotation of the cam 110 will cause oscillation of the drive shaft 115 and stepping rotation of the drive shaft portion 115a. This stepping rotation is transferred through the bevel gearing 119 to the platform drive shaft 120. The platform drive shaft 120, in turn, carries a pinion 131 which is in meshing engagement with the plurality of rack teeth 132 formed on platform shaft 62. In this way, rotational stepping movement of the shaft portion 115a causes downward movement of the platform 60 in incremental steps. To couple the slice thickness adjusting mechanism to the drive for the platform 60, the cam setting shaft 74 is formed with a helically threaded section 135 which threadably engages a stop block 136 that is slidably mounted on a rod 137 secured within the housing 12. The block 136 carries an adjustable stop 138 which cooperates with a lug 139 on the rack 112 to arrest return movement of the rack under the biasing force of the spring 122.

It can be seen that the magnitude of the steps through which the platform 40 is lowered depends upon the distance the rack 112 is moved by the cam 10 during each revolution of the blade 26. This distance, in turn, is determined by the starting position of the rack to which it is returned by the spring 122 before being again driven by the cam 110. Since the stop block 136 arrests return movement of the rack 112 and determines the starting position from which the rack is driven by the cam 110, it will be seen that the position of the block 136 controls the magnitude of the steps through which the platform is advanced each time the rack is actuated by the cam 110.

Rotation of the cam setting shaft 74, through manipulation of the knob 75, not only positions the lift cam 71 so as to space the blade 26 at a selected distance above the cutting table 25, but also positions the stop block 136 relative to the rack 112 by virtue of the threaded engagement between the section 135 and the block 136. The adjustable stop 138 is positioned and fixed so that the slice thickness determined by the positioning of the blade 26 is approximately equal to the incremental steps through which the platform set 60 is lowered. When the lift cam 71 is turned by the setting shaft 74 to raise the blade 26 and increase the slice thickness, the stop block 136 is driven toward the cam 110 so as to increase the throw of the rack 112 and the magnitude of the steps through which the platform 60 is lowered. The reverse adjustment is, of course, the same. In this way, setting of the single knob 75 positions the blade 26 relative to the cutting table 25 and also adjusts the drive for the stacking platform 60. As a result, the platform is always lowered at the proper rate to insure uniform stacking.

In order to permit selection of the number of slices in each stack formed by the machine 10, a settable counter 140 is provided to control a platform clearing drive including a motor 141 and an electric clutch 142. The electric clutch 142 is interposed in the shaft 120 so that a drive is maintained from the bevel gears 119 to the platform sprocket 131 only when the clutch is energized and engaged. The motor 141 is coupled to the declutchable portion of the shaft 120 by a chain 143. It will thus be apparent that when the clutch 142 is deenergized and the motor 141 energized, the platform drive shaft is disconnected from the main drive shaft 115 and is rotated by the motor 141. The motor operates to quickly drive the platform downwardly to its discharge position, established by abutment of the frame 41 with the upper surface of the collar 43.

The operation of the motor 141 and the clutch 142 under the control of the counter 140 can be best understood by briefly reviewing the cam plate control circuit shown in FIG. 9. The counter 140 is first set to the number of slices desired in each stack to be produced by the machine 10. The counter is stepped by the closing of the normally open switch 145 which is operated once upon each revolution of the slicer blade 26 by the cam 110 (see also FIGS. 4 and 8). When the switch 145 has been operated a sufficient number of times to step the counter 140 to the set position, the counter opens a set of normally closed contacts 146 and closes a set of normally open contacts 147. Opening the contacts 146 deenergizes the clutch 142 so as to free the drive to the platform 60 from the main drive shaft 115. Closing the contacts 147 energizes the motor 141 so as to quickly drive the platform 60 through the remaining distance required to bring it to its discharge position illustrated in dashed lines in FIGS. 4 and 6.

As each step of the counter 140 coincides with the dropping of another slice on the platform 60, the number of slices on the platform when the counter energizes the motor 141 to bring the platform to its discharge position equals the setting of the counter. As explained above, as soon as the platform reaches its discharge position, the stack of slices is carried away by the continuously driven belts 65 of the discharge conveyor 18.

So as to avoid bounce or rebound on the platform when the motor 141 drives it to its discharge position, an electromagnet 148 is mounted just beneath the housing 12 so that a rod 149 depending from the platform 60 comes into close proximity to the coil of the magnet 148 when the platform 60 is in its discharge position. Closing of the contacts 147 by the counter 140 energizes the electromagnet 148 simultaneously with energization of the motor 141, and thus the rod 149 is attracted and momentarily held by the electromagnet to restrain and dampen any tendency of the platform to bounce or rebound as it moves quickly into its discharge position.

Also energized by the closing of the contacts 147 is a timer 151 which, following a brief period of energization, is effective to open a set of normally closed contacts 152 that are effective to deenergize and reset the counter 140. Thus, the contacts 146 remain open and the contacts 147 remain closed only for the brief interval required to time out the timer 151 and this period is, of course, selected to provide sufficient time to drive the platform 60 to its discharge position. Upon opening of the contacts 152 by the timer 151, the counter is restored to its initial reset position with the contacts 147 being open to deenergize the motor 141, the electromagnet 148 and the timer 151, and the contacts 146 being closed to reenergize the clutch 142. The contacts 147 open a moment before the contacts 146 reclose so as to allow a platform biasing spring 155 time for snapping the platform 40 upwardly to its starting position. The operating cycle is then repeated and another stack of slices is formed on the platform with the number of slices in the stack being determined by the setting of the counter 140 and the thickness of each slice being indicated on the scale 78. Preferably, the speed of the motor 141 in the delay period measured by the timer 151 is such that the platform 60 is driven through its discharge position and returned to its starting position in less time than is required for the blade 26 to complete one revolution. There are thus no "lost" slices, nor is there any need to interrupt the slicing operation while the previously sliced stack is transferred to the discharge conveyor 18. It should be noted that the settings of the knob 75 and the counter 140 can be changed while the slicer is in operation without danger to the machine. Package weight can therefore be accurately controlled and desired changes made in the run, without time consuming shut downs or special skill being required.

While the invention has been described in connection with one specific form, it will be apparent that the same is susceptible of numerous modifications within the spirit and scope of this invention. Thus, although the invention has been described with particular reference to a tubular feed member having a circular cross section, it is contemplated that various other geometric shapes will be desirable for certain applications. Accordingly the term "tubular" as used herein and in the appended claims is a generic term which is not to be limited to any particular geometric shape. Similarly, while the term "beveled" has been employed to describe the lower end of the tubular feed member, it is to be understood that this term refers to any configuration which enables the tubular feed member to be disposed obliquely to the plane of the slicer blade with at least the cut-off side of the lower end of the tube in co-planar relationship to the blade to produce the desired scissors-like cutting action. Also, although the apparatus of this invention is especially suitable for the production of oval or oblong slices by disposing the tubular feed member obliquely to the plane of the slicer blade, it is to be understood that the tubular feed member may be disposed perpendicularly to the plane of the slicer blade in cases where the oblong slices are not desired.

I claim as my invention:

1. A loaf feeder for use with a slicing machine having a substantially horizontal, rotatable slicer blade, which feeder comprises the combination of a tubular feed member adapted to continuously receive the product loaves to be sliced and feed said loaves downwardly to the slicer blade, at least the cut-off side of the lower end of said tubular feed member being beveled so as to cooperate with the slicer blade to produce a scissors-like cutting action on a product loaf extending from said tubular member when said member is disposed with its axis obliquely to the plane of the slicer blade, a mounting assembly for mounting said tubular feed member obliquely with respect to the slicer blade, said mounting assembly including a bearing pad adapted to engage the upper surface of the rotatable slicer blade for supporting said mounting assembly and said tubular feed member on said blade, the lower surface of said bearing pad being substantially co-planar with the cut-off side of the lower end of said tubular feed member whereby said member is maintained in accurate alinement with said blade to produce said scissors-like cutting action.

2. A loaf feeder for use with a slicing machine having a substantially horizontal, rotatable slicer blade, which feeder comprises the combination of a tubular feed member adapted to continuously receive the product loaves to be sliced and feed said loaves downwardly to the slicer blade, said tubular feed member having a beveled lower end adapted to be substantially parallel with the slicer blade when said tubular feed member is mounted with its axis obliquely to the plane of the slicer blade so that said lower end of said member cooperates with the blade to produce a scissors-like cutting action on the product loaf extending down from said feed member, whereby oblong slices are cut from said loaf, means for mounting said tubular feed member obliquely with respect to the slicer blade, said mounting means being adjustable for alining said lower end of said feed member with the slicer blade, and inwardly biased guide means within the lower portion of said tubular feed member for holding the product loaf against the cutoff side of said feed member.

3. A loaf feeder for use with a slicing machine having a substantially horizontal, rotatable slicer blade, which feeder comprises the combination of a tubular feed member adapted to continuously receive the product loaves to be sliced and feed said loaves downwardly to the slicer blade, at least the cut-off side of the lower end of said tubular feed member being beveled so as to cooperate with the slicer blade to produce a scissors-like cutting action on a product loaf extending down from said tubular member when said member is disposed obliquely with respect to the plane of the slicer blade, whereby oblong slices are cut from said loaf, inwardly biased guide means within the lower portion of said tubular feed member for urging the lower portion of the product loaf against the cut-off side of the tube at the lower end thereof, a mounting assembly for mounting said tubular feed member obliquely with respect to the slicer blade, said mounting assembly including a bearing pad for supporting said mounting assembly and said tubular feed member on the upper surface of the rotatable blade, the lower surface of said bearing pad being substantially co-planar with the cut-off side of the lower end of the tubular feed member whereby said member is maintained in accurate alinement with said blade during rotation thereof to produce said scissors-like cutting action, said mounting assembly including adjusting means for initially alining the lower end of said feed member with the slicer blade, an upwardly extending post on the machine frame, and means connecting said mounting assembly to said post for relieving part of the weight of said feed member and said mounting assembly from the rotatable slicer blade.

4. A loaf feeder for use with a slicing machine having a substantially horizontal slicer blade, which feeder comprises the combination of a tubular feed member adapted to continuously receive product loaves to be sliced and feed said loaves downwardly toward the slicer blade, the lower end of said feed member being beveled at least on the cut-off side of the tube so as to cooperate with the blade to produce a scissors-like cutting action on a product loaf extending down from said tubular feed member when said member is disposed with its axis obliquely to the plane of the slicer blade, and means for mounting said tubular feed member obliquely with respect to the slicer blade, said mounting means including means resting on said blade for supporting said feed member on said blade and maintaining the lower end of said feed member in accurate alignment with said blade to produce said scissors-like cutting action.

5. A loaf feeder for use with a slicing machine having a substantially horizontal, rotatable slicer blade, which feeder comprises the combination of a tubular feed member adapted to continuously receive the product loaves to be sliced and feed said loaves downwardly to the slicer blade, said tubular feed member having a smooth inner surface to permit gravity feeding of said loaves therethrough, said tubular feed member having a beveled lower end adapted to be substantially parallel with the slicer blade when said tubular feed member is mounted with its axis obliquely to the plane of the slicer blade so that said lower end of said member cooperates with the blade to produce a scissors-like cutting action on the product loaf extending down from said feed member, the lower edge of the outboard side of said tubular member lying in the plane of the upper surface of said blade so that said edge and said surface slide on one another upon rotation of the blade, the lower edge of the inboard side of said tubular member being relieved so as to clear the upper surface of said blade, a mounting assembly for mounting said tubular feed member obliquely with respect to the slicer blade, said mounting assembly including a bearing member adapted to engage the upper surface of the rotatable slicer blade for supporting said mounting assembly and said tubular feed member on said blade, the lower surface of said bearing member being substantially co-planar with the lower edge of the outboard side of said tubular feed member whereby said feed member is maintained in accurate alinement with said blade to produce said scissors-like cutting action.

6. A slicing machine comprising, in combination, a frame, a cutting table mounted on said frame, a rotatable shaft disposed at right angles to said table, a slicer blade carried for rotation by said shaft, said blade being disposed in a generally horizontal position above said table, a tubular feed member adapted to continuously receive the product loaves to be sliced and feed said loaves downwardly to the slicer blade, at least the cut-off side of the lower end of said tubular feed member being beveled so as to cooperate with the blade to produce a scissors-like cutting action on a product loaf extending down from said tubular member when said member is disposed with its axis obliquely to the plane of the slicer blade, whereby oblong slices are cut from said loaf, a mounting assembly for mounting said tubular feed member obliquely with respect to the slicer blade, said mounting assembly including a bearing pad adapted to engage the upper surface of the rotatable slicer blade for supporting said mounting assembly and said tubular feed member on said blade, the lower surface of said bearing pad being substantially co-planar with the cut-off side of the lower end of said tubular feed member whereby said member is maintained in accurate alinement with said blade to produce said scissors-like cutting action, said table having a discharge port for passing slices from said loaf through said table, a vertically movable platform mounted on said frame beneath said port for receiving said slices in stacked relation, said platform having a starting position closely underlying said port, and means for lowering said platform in incremental steps synchronized with the rotation of said blade and proportional to the thickness of the slices cut by said blade.

7. A slicing machine comprising, in combination, a frame, a substantially horizontal, rotatable slicer blade mounted on said frame, a tubular feed member adapted to continuously receive the product loaves to be sliced and feed said loaves downwardly to the slicer blade, at least the cut-off side of the lower end of said tubular feed member being beveled so as to cooperate with the slicer blade to produce a scissors-like cutting action on a product loaf extending from said tubular member when said member is disposed with its axis obliquely to the plane of the slicer blade, a mounting assembly for mounting said tubular feed member obliquely with respect to the slicer blade, said mounting assembly including a bearing pad adapted to engage the upper surface of the rotatable slicer blade for supporting said mounting assembly and said tubular feed member on said blade, the lower surface of said bearing pad being substantially co-planar with the cut-off side of the lower end of said tubular feed member whereby said member is maintained in accurate alinement with said blade to produce said scissors-like cutting action, a vertically movable platform mounted on said frame beneath said blade for receiving slices from said loaf in stacked relation, means for axially shifting said blade to vary the thickness of said slices, the bearing engagement between said bearing pad and the upper surface of said blade causing said mounting assembly and said tubular feed member to always follow said axial shifting of said blade.

8. A slicing machine comprising, in combination, a frame, a cutting table mounted on said frame, a rotatable shaft disposed at right angles to said table, a slicer blade carried for rotation by said shaft, said blade being disposed above said table, a tubular feed member adapted to continuously receive the product loaves to be sliced above said blade and to feed said loaves downwardly to the slicer blade, at least the cut-off side of the lower end of said tubular feed member being beveled so as to cooperate with the blade to produce a scissors-like cutting action on a product loaf extending down from said tubular member when said member is disposed with its axis obliquely to the plane of the slicer blade, means for mounting said tubular feed member obliquely with respect to the slicer blade, said mounting means including means resting on said blade for supporting said feed member on said blade and maintaining the lower end of said feed member in accurate alignment with said blade to produce said scissors-like cutting action, said table having a discharge port for passing slices from said loaf through said table, a vertically movable platform mounted on said frame beneath said port for receiving said slices in stacked relation, said platform having a starting position closely underlying said port, means for driving said shaft so as to rotate said blade past the lower end of said tubular feed member, means actuated each time said blade rotates past said feed member for lowering said platform in incremental steps, and means for axially shifting said shaft to vary the spacing of said blade from said table, said last-named means also varying the magnitude of said incremental steps to approximately equal the spacing of the blade from the table.

9. A loaf feeder for use with a slicing machine having a substantially horizontal, rotatable slicer blade, which feeder comprises the combination of a tubular feed member adapted to continuously receive the product loaves to be sliced and feed said loaves downwardly to the slicer blade, at least the cut-off side of the lower end of said tubular feed member being adapted to cooperate with the slicer blade to produce a scissors-like cutting action on a product loaf extending down from said tubular member, a mounting assembly for mounting said tubular feed member for cooperation with said slicer blade, said mounting assembly including a bearing pad adapted to engage the upper surface of the rotatable slicer blade for supporting said mounting assembly and said tubular feed member on said blade, the lower surface of said bearing pad being substantially co-planar with the cut-off side of the lower end of said tubular feed member whereby said member is maintained in accurate alinement with said blade to produce said scissors-like cutting action.

10. A loaf feeder for use with a slicing machine having a substantially horizontal, rotatable slicer blade, which feeder comprises the combination of a tubular feed member adapted to continuously receive the product loaves to be sliced and feed said loaves downwardly toward the slicer blade, at least the cut-off side of the lower end of said tubular feed member being adapted to cooperate with the rotatable slicer blade to produce a scissors-like cutting action on a product loaf extending down from said tubular feed member, and means for mounting said tubular feed member for cooperation with said rotatable slicer blade, said mounting means including means resting on said blade for supporting said feed member on said blade and maintaining the lower end of said feed member in accurate alignment with said blade to produce said scissors-like cutting action.

References Cited by the Examiner
UNITED STATES PATENTS

| | | |
|---|---|---|
| 2,009,259 | 7/1935 | Hall et al. _____ 146—94 XR |
| 2,275,524 | 3/1942 | Gronich _____ 146—94 XR |
| 2,528,914 | 11/1950 | Roest et al. _____ 146—105 XR |
| 2,585,673 | 2/1952 | Uttersland _____ 146—114 XR |

FOREIGN PATENTS

| | | |
|---|---|---|
| 837,060 | 6/1960 | Great Britain. |

WILLIAM W. DYER, Jr., *Primary Examiner.*

J. MEISTER, *Assistant Examiner.*